United States Patent [19]
Wilkins et al.

[11] Patent Number: 5,590,758
[45] Date of Patent: Jan. 7, 1997

[54] SLAT SORTER

[75] Inventors: John J. Wilkins; Walter L. Steffens, both of Cincinnati, Ohio

[73] Assignee: Western Atlas Inc., Hebron, Ky.

[21] Appl. No.: 467,844

[22] Filed: Jun. 6, 1995

[51] Int. Cl.$^6$ ................................................ B65G 47/46
[52] U.S. Cl. ...................... 198/890.1; 198/440; 198/849; 198/845
[58] Field of Search ................................ 198/803.2, 850, 198/849, 845, 890, 890.1, 838, 840, 370.02, 370.03, 440

[56] References Cited

U.S. PATENT DOCUMENTS

| | | | |
|---|---|---|---|
| 1,069,901 | 8/1913 | Petersen | 198/803.2 |
| 3,731,782 | 5/1973 | Del Rosso | 198/849 X |
| 4,089,408 | 5/1978 | Vanderhoof | 198/803.2 X |
| 4,138,008 | 2/1979 | Del Rosso | 198/890.1 |
| 4,637,508 | 1/1987 | Kikuchi et al. | 198/803.2 X |
| 4,917,233 | 4/1990 | Tsuda et al. | 198/838 X |
| 4,932,515 | 6/1990 | Stohr | 198/838 X |
| 4,946,022 | 8/1990 | Davis et al. | 198/890.1 |
| 4,984,675 | 1/1991 | Yamabe et al. | 198/890.1 |
| 5,060,788 | 10/1991 | Compton et al. | 198/838 X |
| 5,217,103 | 6/1993 | Umlauf | 198/890.1 |

*Primary Examiner*—D. Glenn Dayoan
*Attorney, Agent, or Firm*—Brian L. Ribando

[57] ABSTRACT

A slat sorter includes a plurality of platens each supported by two slats. The slats are driven by hollow pin chain and are fastened to the chain by a ball detent pin which passes through the hollow pin of the chain into the slat end. The head of each ball detent pin acts as a bearing surface against a wear strip which confines lateral motion of the slats. The divert switches in the sorter use a switch arm driven by a motor. The arm is configured to allow rapid switching and a brake on the motor prevents rotation of the motor in the event of power failure to prevent the arm from drifting into an intermediate, potential crash, position.

12 Claims, 9 Drawing Sheets

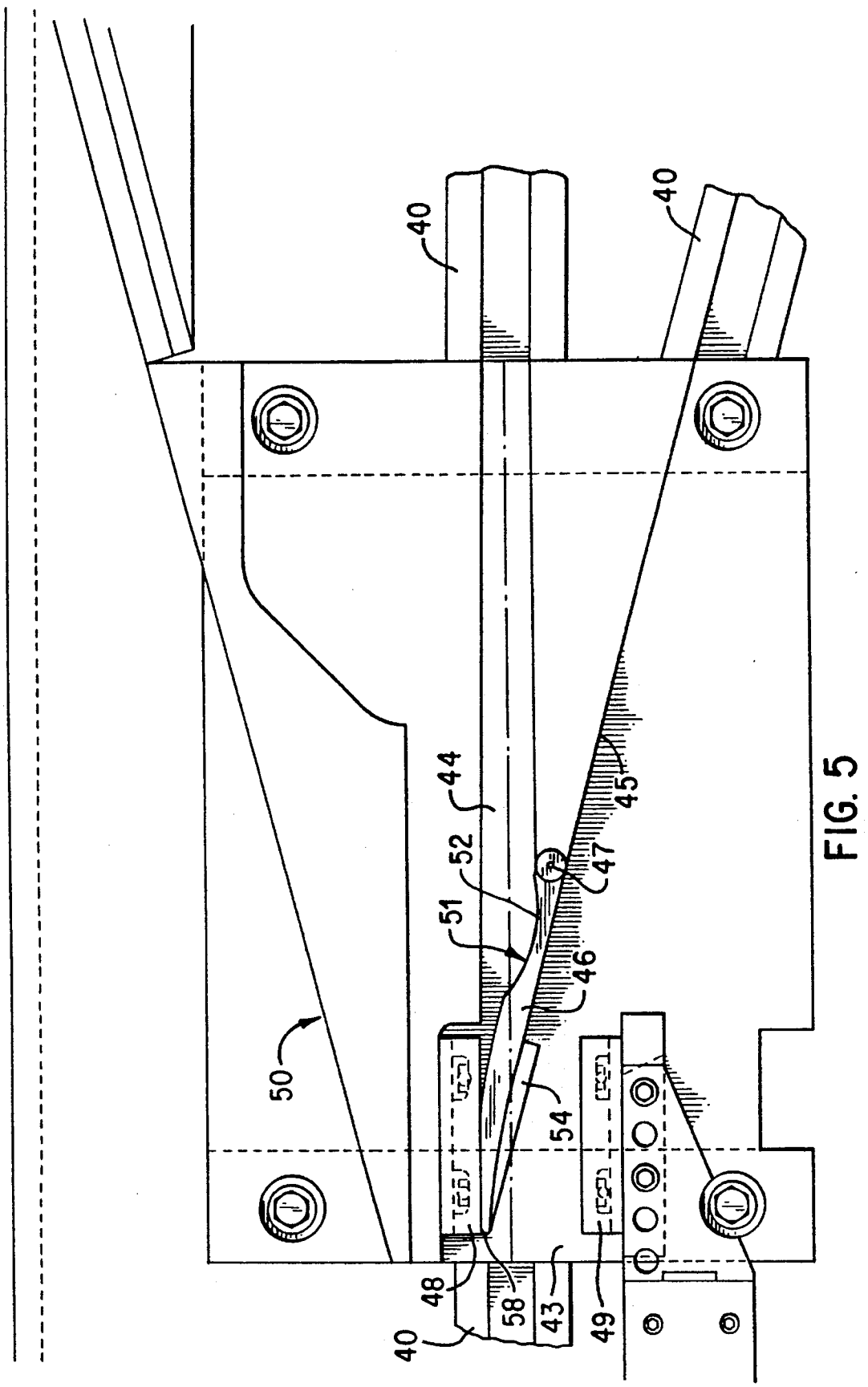

5,590,758

SLAT SORTER

FIELD OF THE INVENTION

The invention relates to a slat sorter comprising a conveyor with movable platens on the top surface thereof which receive and selectively position a series of articles across the width of the conveyor.

BACKGROUND OF THE INVENTION

Slat sorters are well known in the art and are used to rearrange a single file line of articles on a conveyor into a preselected array of articles positioned across the width of the conveyor. Such sorters are used for example to rearrange articles into a desired pattern for delivery to the in-feed of a palletizer. As higher throughput rates are required of all material handling systems the throughput rate of a slat sorter must be increased as well. In order to accomplish this, some elements of the slat sorter must be redesigned to accommodate the higher speed of operation. For example, the switches in the sorter which divert the platens to a desired position must be designed to switch from a straight-through position to a divert position, and vice versa, in a minimum amount of time in order to handle the increased speed of the platens without creating a jam, or missed divert situation. As the speed of the slat sorter increases, the wear of the individual components likewise increases, and accordingly, the components should be designed to operate with minimized wear and to be easily removed and replaced when replacement is necessary.

SUMMARY AND OBJECTS OF THE INVENTION

In accordance with the instant invention, each divert switch in a slat sorter has a switch arm with a cutout to allow the arm to move to a divert position before the preceding diverter pin has completed its travel past the arm. Each switch arm is driven by a limited angle electric torque motor which includes a brake to provide resistance to rotation of the motor and the switch arm when power to the motor is interrupted. This will prevent the arm from drifting into an intermediate position which could cause a crash with oncoming pins in the event that a single motor fails. The drive chains of the sorter are attached to the conveyor slats by means of short pins which may be easily withdrawn from the slats to allow replacement of the slats when necessary. The pins are formed with smooth flat heads which are hardened and ride against a lateral wear strip on the conveyor frame without unduly wearing either the pin heads or the strip.

It is accordingly an object of the invention to provide a slat sorter which is designed to be operated at increased speed to achieve higher throughput rates.

It is another object of the invention to provide a slat sorter in which the individual switch components are designed to be operated with minimized wear and to be easily removed and replaced when replacement becomes necessary.

It is another object of the invention to provide a motor for a switch arm which includes a brake to hold the arm in a desired position in the event of motor failure.

It is still another object of the invention to provide a bearing surface on the side of the slat sorter drive chain which rides against a lateral wear strip on the conveyor frame to provide lateral chain guidance.

These and other objects of the invention will be apparent from the following detailed description in which reference numerals used throughout the description correspond to those used on the drawing figures.

BRIEF DESCRIPTION OF THE DRAWINGS

FIGS. 4 and 5 show a divert switch in the straight through and divert positions, respectively.

DESCRIPTION OF THE PREFERRED EMBODIMENT

Figure 1:
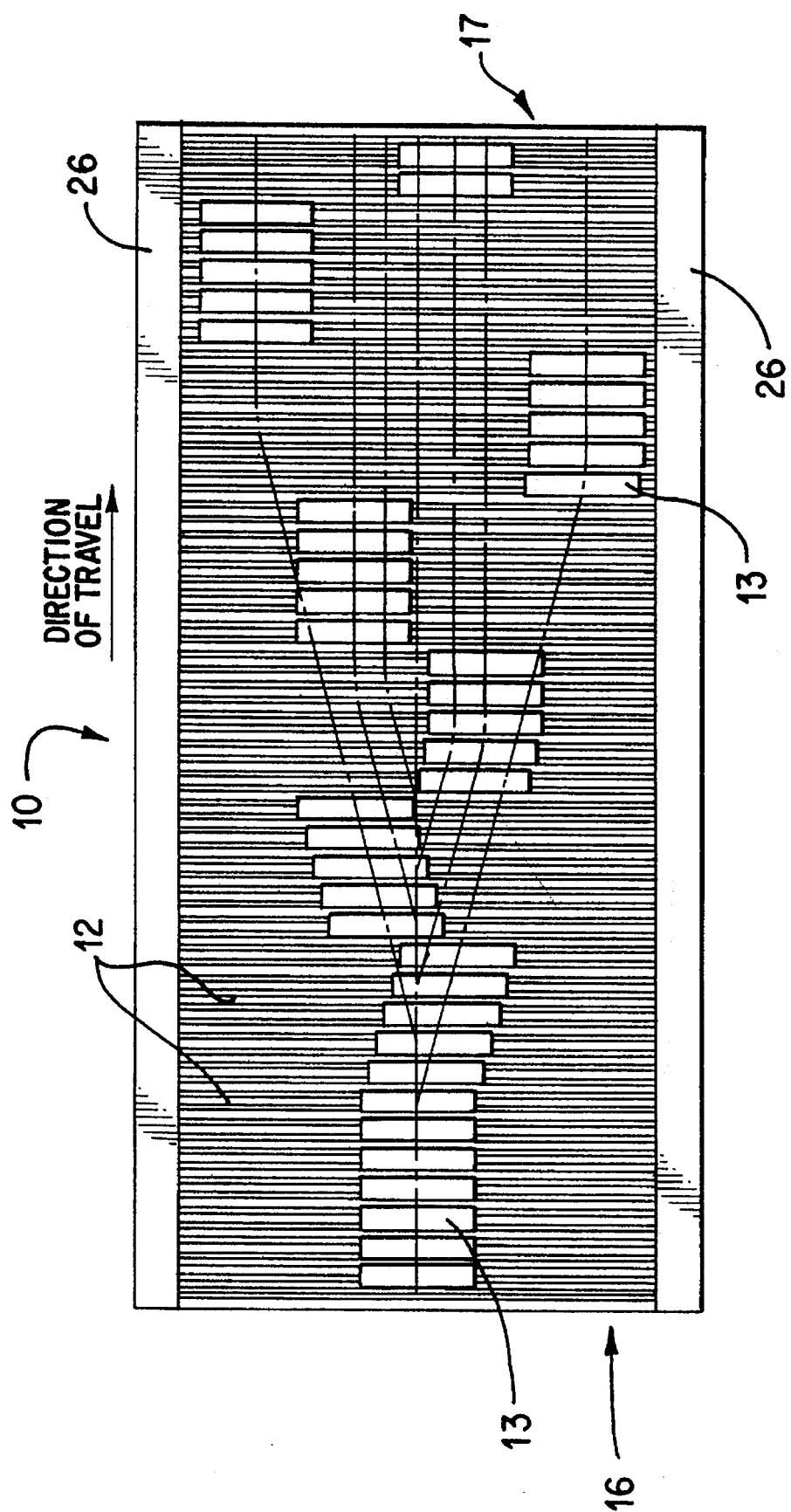
FIG. 1 is a plan view of the slat sorter of the invention.

Turning now to the drawing figures, there shown in FIG. 1 a plan view of a slat sorter generally designated by the reference numeral 10. The sorter comprises a conveyor surface formed by a plurality of tubes or slats 12 which support platens 13 which carry articles (not shown). The slats 12 are connected at either end to endless drive chains 14 which advance the slats and the platens along the length of the slat sorter from the in-feed end 16 to the discharge end 17.

Figure 4:
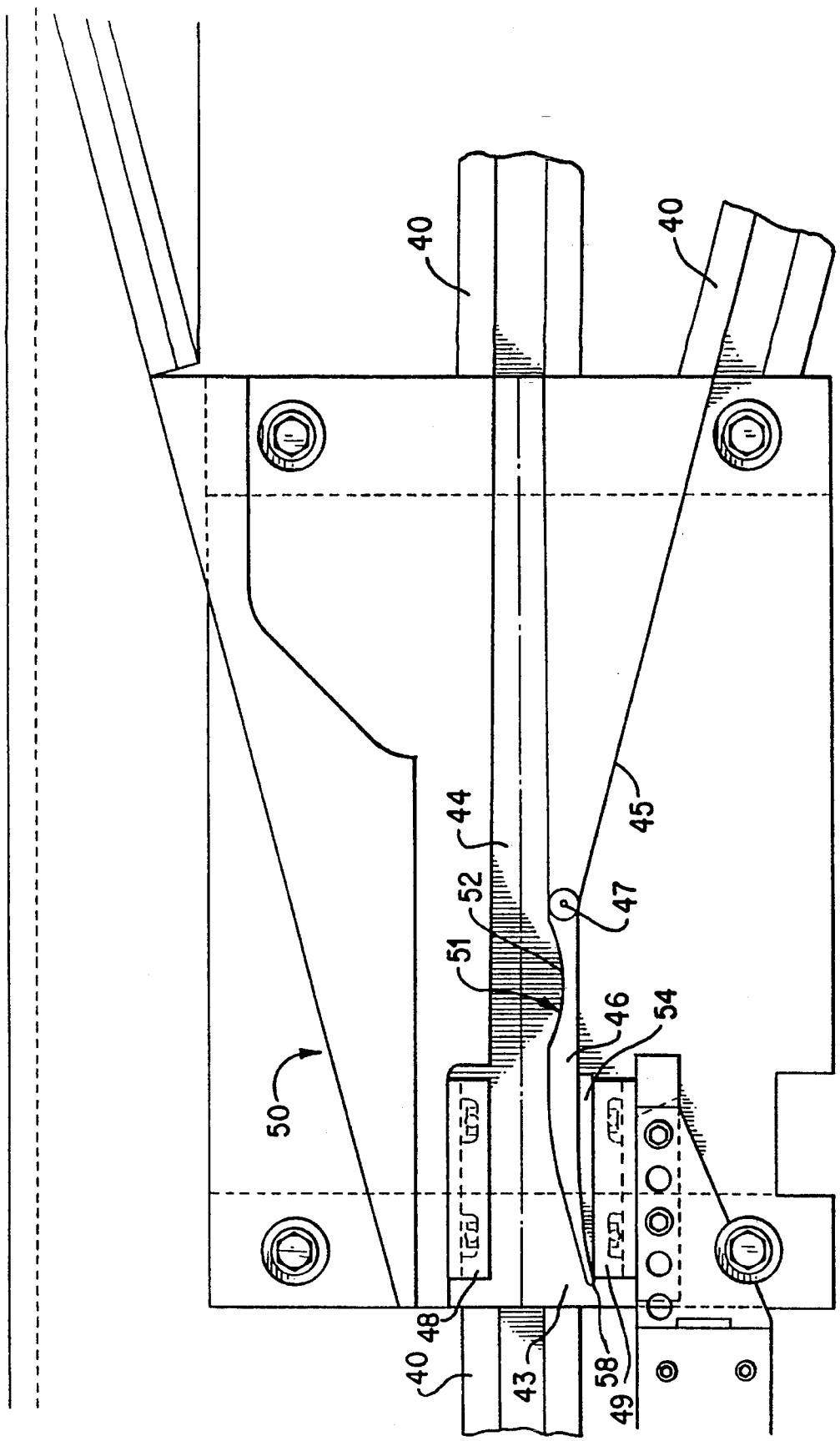

All of the platens 13 at the in-feed end 16 of the slat sorter are positioned mid-way between the sides of the sorter. Cam tracks and switches (as shown in FIG. 4) are located beneath the surface of the sorter and are used to divert the platens 13 to one of several final platen positions at the discharge end 17 in a manner which is well known in the art. Other configurations of the slat sorter are possible in which the platens 13 at the infeed end 16 are initially located at some other position across the width of the slats 12.

Figure 2:
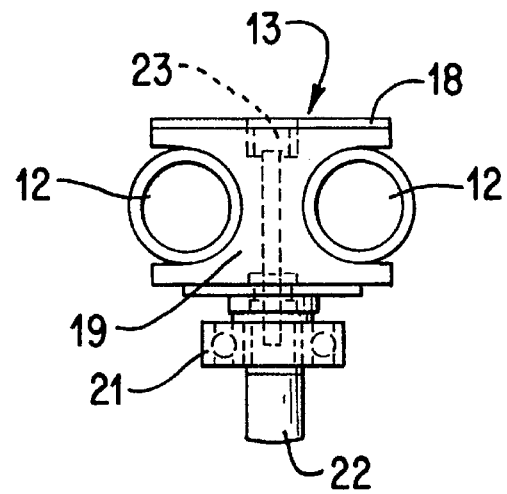
FIG. 2 is an end view of a slat assembly and a platen from the slat sorter of FIG. 1.
Figure 8:
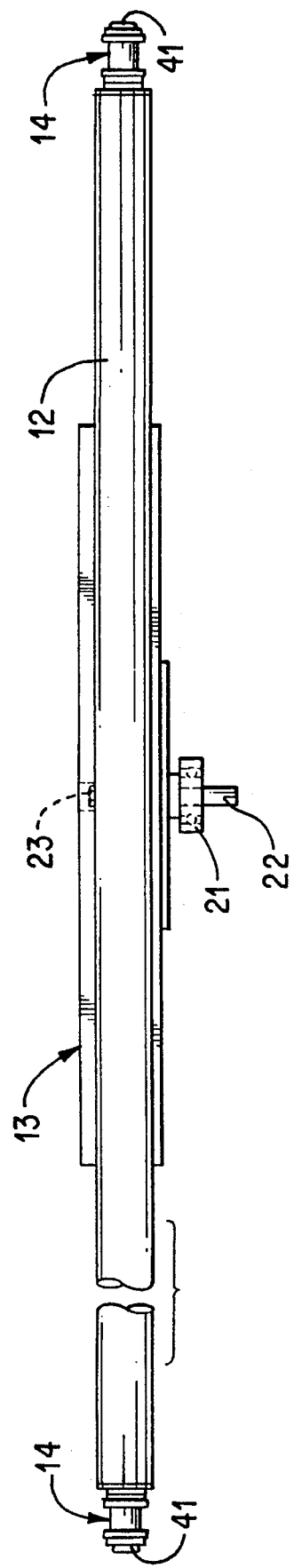
FIG. 8 is a front view of the slat assembly of FIG. 2.

As shown in FIG. 2, each platen 13 is mounted on a pair of slats 12 and includes a top surface 18 and a body 19. A bearing 21 and a diverter pin 22 are attached to the underside of the body 19 by a threaded fastener 23 which passes through the body. In use, the diverter pin 22 and the bearing 21 are guided by cam tracks and switches positioned below the surface of the slat sorter which control the motion of the platens as they are driven by the endless chains 14 to the discharge end 17. FIG. 8 shows a front view of the slat assembly of FIG. 2.

Figure 3:
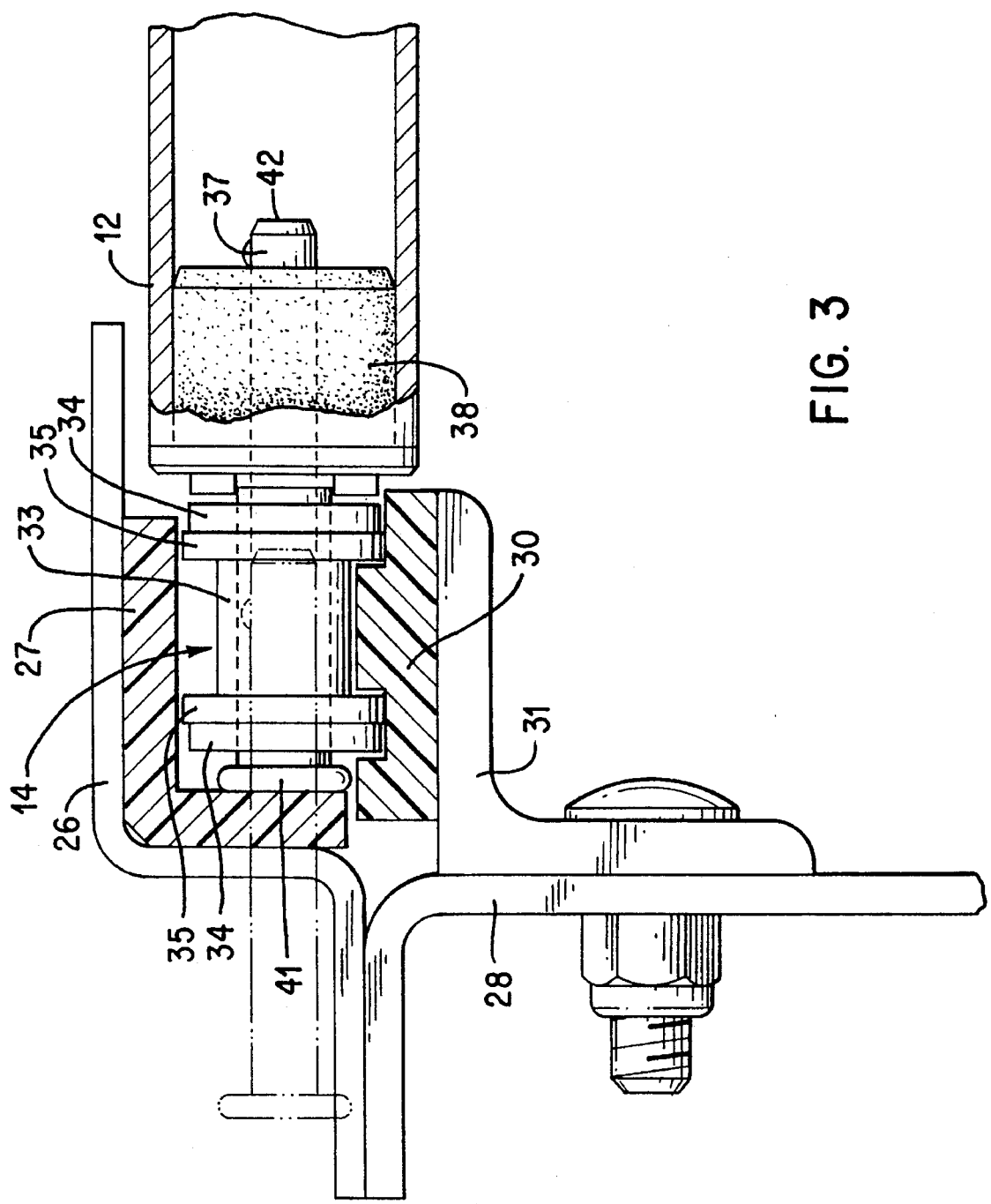
FIG. 3 is a detail view of the attachment of a slat to the drive chain of a slat sorter.

FIG. 3 shows in detail the attachment of the drive chain 14 to one end of a slat 12. A cover flange 26 which includes a UHMW wear strip 27 is mounted to the frame 28 of the sorter and protects the chain from dirt and other foreign articles. The chain 14 rides on a UHMW track 30 which is mounted on a bracket 31. The chain 14 comprises commercially available hollow-pin chain which employs a hollow pin 33 to join adjacent links 34 and 35 to one another. A ball detent pin 37 passes through the hollow pin 33 of the chain to couple the chain to the end of the slat. A resilient bushing 38 preferably formed from urethane, is pressed into the end of the slat 12 and receives the ball detent pin 37. The ball detent pin extends only a short distance into the end of the slat and is formed with a large smooth head 41 which forms a bearing surface to ride against the UHMW wear strip 27. The head 41 and the shank of the pin 37 which engages the bore of the hollow pin 33 is hardened to resist wear.

In order to remove a slat 12 from the chain 14, it is only necessary to remove the cover flange 26 with the strip 27 and withdraw the ball detent pin 37 a sufficient mount so that the end 42 of the pin is drawn out of engagement with the bushing 38 in the slat. Once this has been done the end of the slat 12 can be lifted from the chain 14 and withdrawn from engagement with the connection means which secures the other end of the slat to the other drive chain (not shown). The other end of the slat may be secured to the other chain with a ball detent pin or with a plain pin which extends from the chain to engage the slat without departing from the sprit of the invention.

In known prior art constructions, the slats are attached to the chains by a rod which extends from one end of the slat to the other and is secured to the chain at either end by threaded fasteners, cotter pins, horseshoe clips, or the like. In order to remove a slat from the chain, the rod must be withdrawn completely from the slat requiring a clearance space at least as great as the length of the rod alongside of the conveyor frame. Assuming the conveyor is 48" wide, a 48" clear, race space is required in order to withdraw the rod. Most rods have a clean sharp edged end and this end rides along the UHMW wear strip 27 on the side of the conveyor. The sharp edged end rapidly wears the strip 27 requiring replacement of the strip to prevent damage to the conveyor frame and the rod end.

Figure 7:
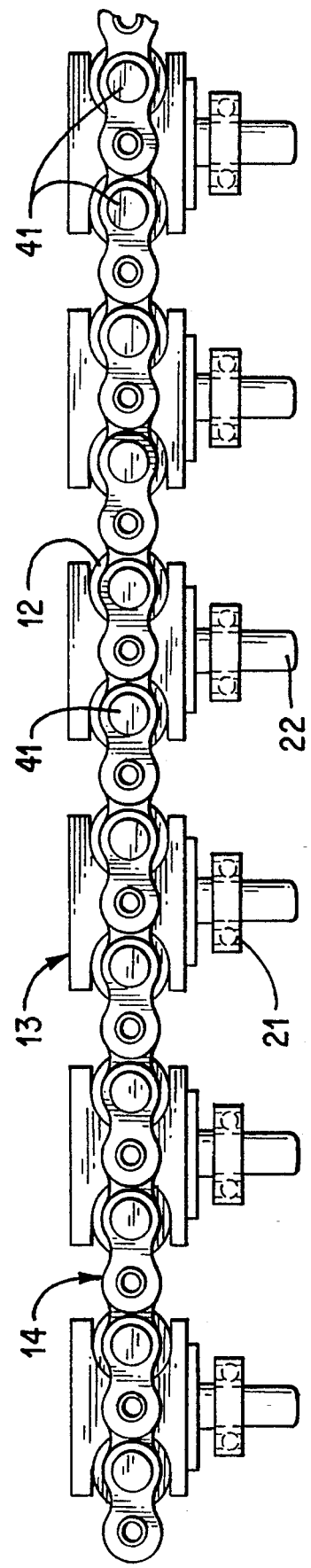
FIG. 7 is a side view of a plurality of slat assemblies coupled to a chain.
Figure 9:
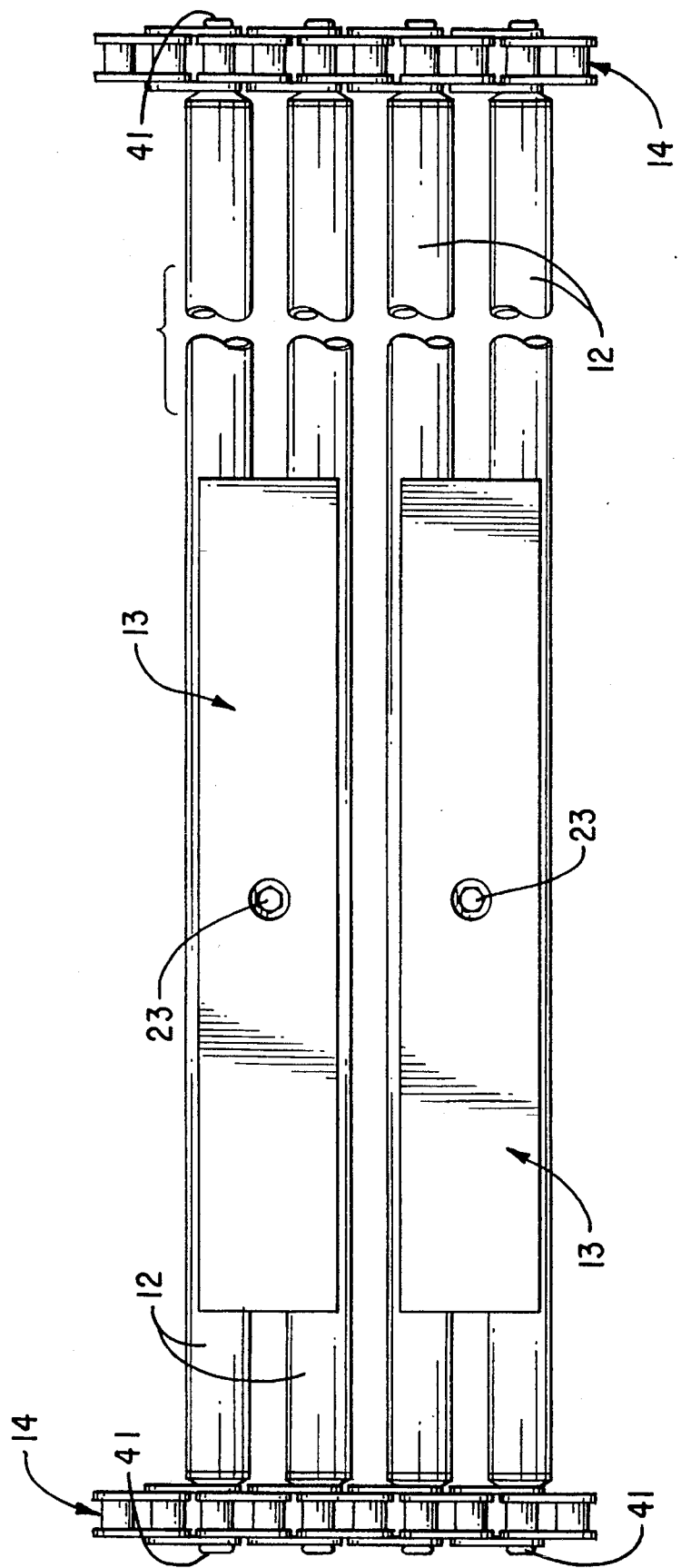
FIG. 9 is a top view of FIG. 7 showing two slat assemblies.

FIG. 7 shows a plurality of slat assemblies coupled to a length of drive chain 14. FIG. 9 is a top view of the construction shown in FIG. 7 showing two slat assemblies coupled at both ends to drive chains 14.

FIGS. 4 and 5 show a divert switch 50 in the straight-through and divert positions respectively. Sections of pin track 40 are coupled to the infeed and exit portions of the switch. The switch 50 comprises an infeed track 43, a straight through track 44, a divert track 45, and an arm 46 which is pivoted on an axis 47 to swing between two stops 48 and 49. In the position shown in FIG. 4, a lower stop flange 54 formed on the lower edge of the arm 46 rests against the stop 49. The arm 46 includes a cutout 51 the downstream or exit portion 52 of which, as shown in FIG. 5, is in alignment with the straight-through exit track 44 when the arm is in the divert position as shown in FIG. 5. The cutout 51 allows the arm to return to the divert position against the stop 48 from the straight-through position against the stop 49 before the divert pin 22 has left the exit portion 52 of the cutout 51 resulting in faster switching times.

Figure 6:
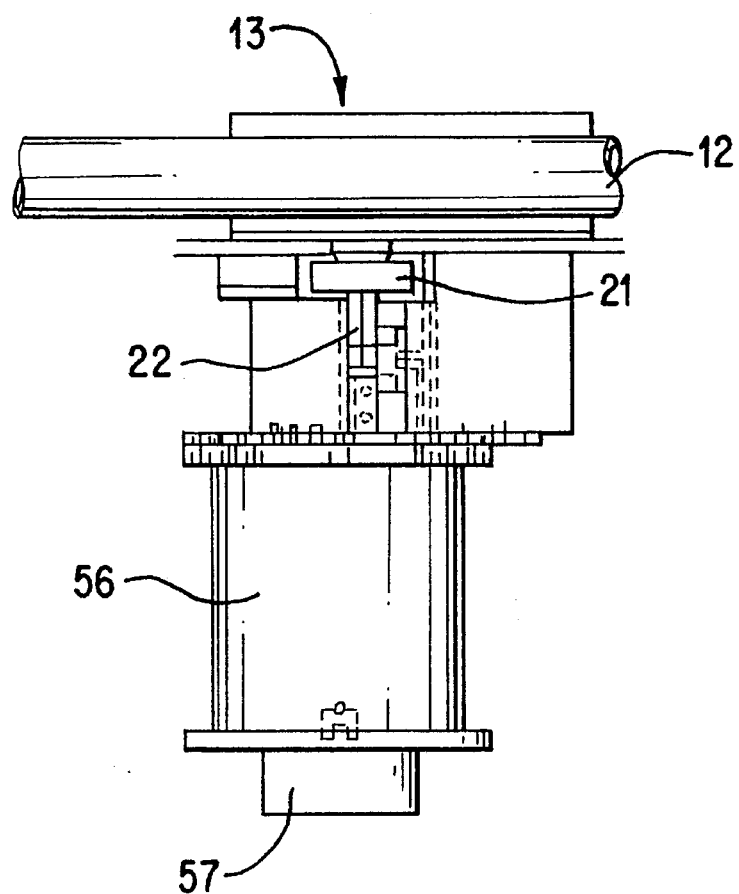
FIG. 6 shows a motor and a brake assembly for a divert switch.

The switch arm 46 is driven by an electric motor 56 as shown in FIG. 6. The motor is a limited angle torque motor which drives the arm to the desired position against one of the stops 48 and 49 in response to the application of switching signals. A brake 57 mounted on the end of the motor 56 holds the arm against one of the steps 48 and 49 in the event of loss of power to the motor. The brake provides resistance to arm motion but does not lock the arm in an immovable position. As a result, a diverter pin which strikes the side of a switch arm will rotate the arm against the resistance of the brake until it comes to rest against one of the stops. Once the arm is against one of the stops, the brake will hold the arm in that position, preventing it from drifting into a position where the arm tip 58 could be struck head-on by a diverter pin.

Figure 10:
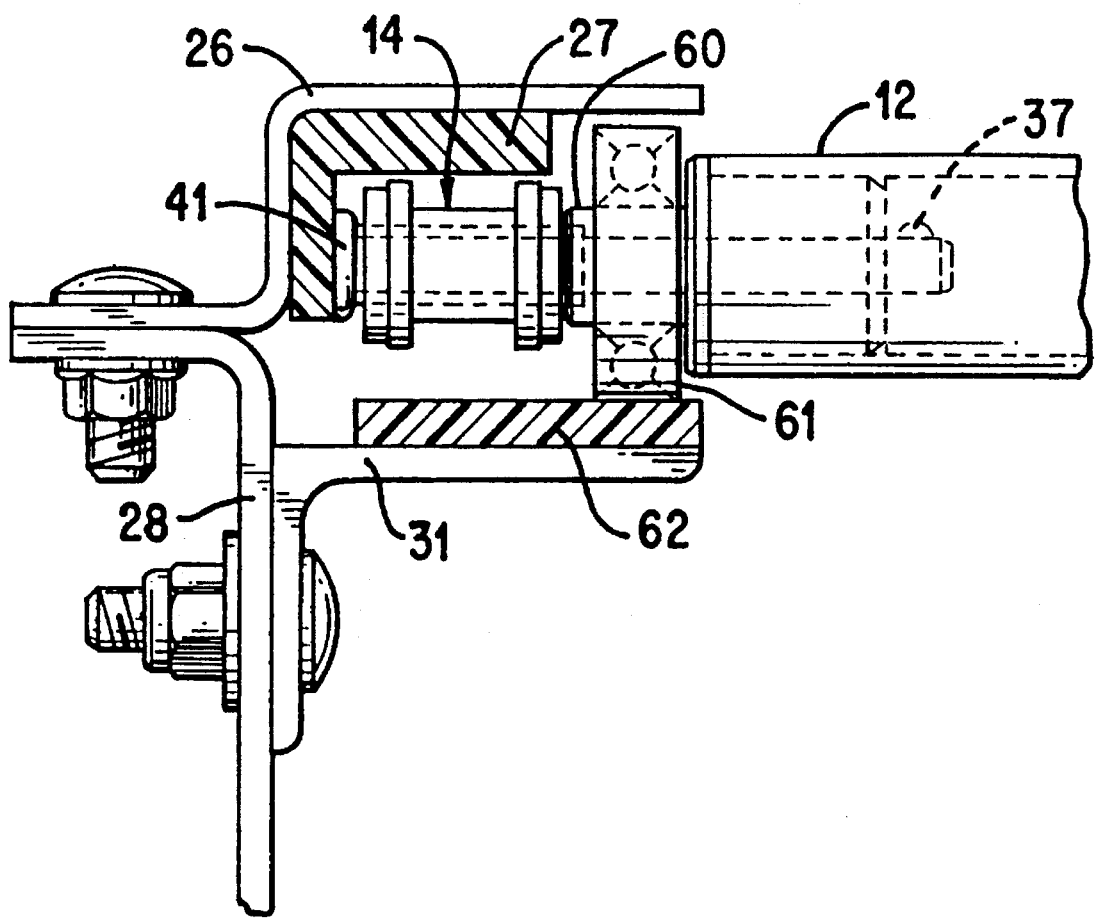
FIG. 10 shows an alternate embodiment of the invention in which the slat is supported by a bearing.

FIG. 10 shows an alternate embodiment of the invention in which a boss 60 is formed on the end of the bushing 38 and a ball bearing 61 is mounted on the boss. The bearing 61 rolls like a wheel on a track 62 which is mounted on the bracket 31. In use, the rolling resistance of the bearing 61 on the track 62 is less than the sliding resistance of the chain 14 on the track 30 shown in FIG. 3, allowing the embodiment of FIG. 10 to run at higher speeds and to carry heavier loads. If desired, the track 62 can be formed with a rectangular trough wide enough to accommodate the width of the bearing 61 to provide additional guidance for the bearing.

Having thus described the invention, various alterations and modifications will occur to those skilled in the art, which modifications and alterations are intended to be within the scope of the invention as defined by the appended claims.

What is claimed is:

1. A slat sorter having a series of platens slidably mounted on an array of slats which are driven by a pair of endless chains, the sorter comprising:

a pair of hollow pin chains comprising the endless chains, the hollow pin chains having hollow pins which are used to couple adjacent links of the chain together, means for mounting the slats to the endless chain, said means for mounting comprising a separate pin which is slidably received by the hollow pin of the chain and removably received by the slat, said pin extending only a short distance into the slat to allow disconnection of the slat from the chain by withdrawing said pin from engagement with the slat by withdrawing said pin from the chain.

2. The slat sorter of claim 1 further comprising:

a short insert in the end of the shit which receives said pin, said insert providing a snug fit around the end of the said pin.

3. The slat sorter of claim 2 further comprising:

a ball detent on the end of said pin, wherein the end of the pin with the ball detent extends through the short insert to provide resistance to withdrawal of the pin from the insert.

4. The slat sorter of claim 3 wherein the short insert is a urethane bushing.

5. The slat sorter of claim 1 further comprising a head on said pin having a smooth flat surface, wherein the head acts as a bearing surface to provide lateral guidance for the chain.

6. The slat sorter of claim 5 wherein the head and the shank of the pin which engage the chain are hardened to resist wear.

7. The slat sorter of claim 1 further comprising:

a bracket mounted on the slat sorter frame for supporting the slats, a broad flat head on the separate removable pin, and a lateral wear strip mounted alongside the head of the pin, whereby the broad flat head of the removable pin rides against the lateral wear strip to provide lateral guidance to the chain and the slats.

8. The slat sorter of claim 7 further comprising:

a bushing mounted in the end of the slat, wherein the bushing receives the removable pin.

9. The slat sorter of claim 8 wherein the removable pin is a ball detent pin.

10. The slat sorter of claim 8 wherein the chain is supported by a track which is mounted on the bracket.

11. The slat sorter of claim 8 further comprising a bearing mounted on the end of the slat, wherein the bearing is supported by a track which is mounted on the bracket.

12. The slat sorter of claim 7 wherein the lateral wear strip prevents removal of the removable pin from the end of the slat.

* * * * *